US008694201B2

(12) United States Patent
Kolletzki

(10) Patent No.: US 8,694,201 B2
(45) Date of Patent: Apr. 8, 2014

(54) VEHICLE MULTIMEDIA SYSTEM

(75) Inventor: Johannes Kolletzki, Neckartailfingen (DE)

(73) Assignees: Harman International Industries, Incorporated, Stamford, CT (US); Harman Becker Automotive Systems GmbH, Stamford, CT (US)

( * ) Notice: Subject to any disclaimer, the term of this patent is extended or adjusted under 35 U.S.C. 154(b) by 523 days.

(21) Appl. No.: 12/647,963

(22) Filed: Dec. 28, 2009

(65) Prior Publication Data

US 2010/0106367 A1 Apr. 29, 2010

Related U.S. Application Data

(62) Division of application No. 11/213,509, filed on Aug. 26, 2005, now Pat. No. 7,643,917.

(30) Foreign Application Priority Data

Aug. 26, 2004 (EP) .................................... 04020225
Aug. 26, 2004 (EP) .................................... 04020226

(51) Int. Cl.
*G06F 17/00* (2006.01)
*G06F 19/00* (2011.01)
*G06F 3/02* (2006.01)
*G01C 21/00* (2006.01)

(52) U.S. Cl.
USPC ............. 701/36; 701/538; 715/716; 715/810; 715/811; 715/814; 340/995.16

(58) Field of Classification Search
USPC ........ 701/1, 29, 31, 32, 35, 36, 49, 200, 29.1, 701/29.6, 400, 538; 715/716, 717, 727, 715/811–814, 817–827, 828, 830, 832, 835, 715/841, 844, 853, 854, 866, 718, 719, 715/728; 340/825, 825.5, 3.1, 3.3, 3.32, 340/1.1, 2.1, 995.14, 995.16
See application file for complete search history.

(56) References Cited

U.S. PATENT DOCUMENTS 4,862,498 A 8/1989 Reed
5,187,797 A 2/1993 Nielsen et al.
(Continued)

FOREIGN PATENT DOCUMENTS

DE 40 01 062 A1 7/1991
DE 198 49 328 A1 5/2000
(Continued)

OTHER PUBLICATIONS

IBM Technical Disclosure Bulletin; Methodology for Dynamic Menu Escalation Selection for Pull-Down Menu; vol. 37, No. 3; Mar. 1994.

(Continued)

*Primary Examiner* — Thomas Tarcza
*Assistant Examiner* — Edward Pipala
(74) *Attorney, Agent, or Firm* — Alleman Hall McCoy Russell & Tuttle LLP

(57) ABSTRACT

A vehicle multimedia system includes a display that displays a hierarchically structured menu. The hierarchically structured menu may have a main menu, a plurality of submenus, and menu items. The multimedia system provides a memory for storing information identifying a menu or menu item, and a memory control unit for writing information related to a menu item upon a user's selection of the menu by an operating element or by automatic return to a main menu, and displaying the information as selectable menu items identified by the information.

20 Claims, 10 Drawing Sheets

(56) References Cited

U.S. PATENT DOCUMENTS

| | | | |
|---|---|---|---|
| 5,524,190 | A | 6/1996 | Schaeffer et al. |
| 5,757,371 | A | 5/1998 | Oran et al. |
| 5,802,300 | A | 9/1998 | Tanaka et al. |
| 6,069,614 | A | 5/2000 | Singhal |
| 6,128,006 | A | 10/2000 | Rosenberg et al. |
| 6,201,540 | B1 | 3/2001 | Gallup et al. |
| 6,700,839 | B1 | 3/2004 | Auflick et al. |
| 6,819,990 | B2 | 11/2004 | Ichinose |
| 7,035,720 | B2 | 4/2006 | Taxis |
| 7,096,431 | B2 | 8/2006 | Tambata et al. |
| 2001/0034573 | A1 | 10/2001 | Morgan et al. |
| 2001/0045965 | A1 | 11/2001 | Orbanes et al. |
| 2002/0059288 | A1 | 5/2002 | Yagi et al. |
| 2003/0098888 | A1 | 5/2003 | Guenther et al. |
| 2003/0195681 | A1 | 10/2003 | Rother |
| 2004/0128275 | A1 | 7/2004 | Moehrle |
| 2004/0143372 | A1 | 7/2004 | Taxis |

FOREIGN PATENT DOCUMENTS

| | | |
|---|---|---|
| EP | 0 727 734 A1 | 8/1995 |
| EP | 0727734 B1 | 6/2005 |
| JP | 05-197796 | 8/1993 |
| JP | 06-342360 | 12/1994 |
| JP | 07-075432 | 3/1995 |
| JP | 2008-129469 | 5/1996 |
| JP | 2009-325092 | 12/1997 |
| JP | 2000-344028 | 12/2000 |
| JP | A-2001-266199 | 9/2001 |
| JP | A-2003-153230 | 5/2003 |
| WO | WO 99-49443 | 9/1999 |

OTHER PUBLICATIONS

IBM Technical Disclosure Bulletin; Selectable Dynamic Drop-Down List Boxes; vol. 38, No. 12; Dec. 1995.

Snyder, Maryanne K. and Lowney, Gregory C.; Microsoft Windows 95 Keyboard Guide; 1996 ; pp. 1-13.

European Search Report for Application No. 04 020 225.1 dated Apr. 6, 2005.

Anonymous; Menu Selection; Kenneth Mason Publications; vol. 328, No. 71; Aug. 1998.

McFedries, Paul; The Complete Idiot's Guide to Windows 95, Second Edition, Figs. 1-8.

Windows XP; Microsoft Windows XP Pro, Version 2002; Figs. 1-2.

Snyder, Maryann K. and Lowney, Gregory C. Microsoft Windows 95 Keyboard Guide; 1996; pp. 1-13.

McFedries, Paul, The Complete Idiot's Guide to Windows 95, Second Edition; 1997; Figs. 1-13.

Windows XP; Microsoft Windows XP Pro, Version 2002, Figs. 1-2.

Notice Requesting Submission of Opinion, Jul. 13, 2013, Korean Patent Application No. 10-2005-0078965, Korean Patent Office, pp. 1-10.

Examiner's Report, May 14, 2013, Canadian Patent Application No. 2,517,292, Canadian Patent Office, pp. 1-3.

VEHICLE MULTIMEDIA SYSTEM

CROSS-REFERENCE TO RELATED APPLICATIONS

This application is a divisional of U.S. patent application Ser. No. 11/213,509, filed Aug. 26, 2005, now U.S. Pat. No. 7,643,917 titled VEHICLE MULTIMEDIA SYSTEM, which claims the benefit of European Patent Application No. 04 020 226.9, filed Aug. 26, 2004, and European Patent Application No. 04 020 225.1, filed Aug. 26, 2004, all of which are incorporated by reference in this application in their entirety.

BACKGROUND OF THE INVENTION

1. Technical Field

The invention relates to a vehicle multimedia system and in particular, to a vehicle multimedia system having a display for displaying a hierarchically structured menu.

2. Related Art

Multimedia systems are commonly used in a vehicle. Vehicle multimedia systems may include components that are designed specifically for a vehicle, such as high fidelity (hereinafter, referred to "hifi") units, navigation units, and telephone units. Hifi units include, for example, amplifiers, radio tuners, and/or CD/DVD players. Navigation units include, for example, a global positioning system (GPS) device, CD/DVD as a mass storage device, and a control unit for running route guidance software. Telephone units include, for example, a global system for mobile communications (GSM) device, a Universal Mobile Telecommunications System (UMTS) device, and/or a modem to enable internet access.

Vehicle multimedia systems have become popular options upon purchase of a new vehicle. Today, vehicle multimedia systems provide more sophisticated and diverse services and functions than in the past, and the trend towards more advanced systems is increasing. Vehicle multimedia systems may be more user-friendly if they are ergonomically designed, and they contain users-oriented interface.

SUMMARY

A vehicle multimedia system provides various functions and services such as audio services, video services, and navigation services. The vehicle multimedia system may employ a hierarchically structured menu system. Users may select and activate desired services and functions by using the menu system. Users navigate the menu system from a hierarchically highest menu to a hierarchically lowest menu. Each menu may include plural menu items. Upon activation of menu items, users may automatically reach a next menu or perform functions assigned to the activated menu items.

A vehicle multimedia system may include a display for displaying hierarchically structured menus with menu items upon a vehicle user's interaction with an operating element associated with the multimedia system. The vehicle multimedia system includes a memory and a control unit for controlling the memory. The control unit writes information related to menu items in response to activation of a menu item through the operating element or in response to an automatically-caused or manually-caused return to the main menu. The control unit displays the supplied information on the display as selectable and activatable menu items, allowing access to the menus or menu items identified by the displayed information.

The vehicle multimedia system also provides a method for displaying hierarchically structured menus. The method may include displaying a menu on the display, storing information identifying the menu item selected by a user, and/or automatically returning to the main menu. The method may include reading information stored in response to a user interaction with the operating element, and displaying the information as selectable and activatable menu items identified by the information.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
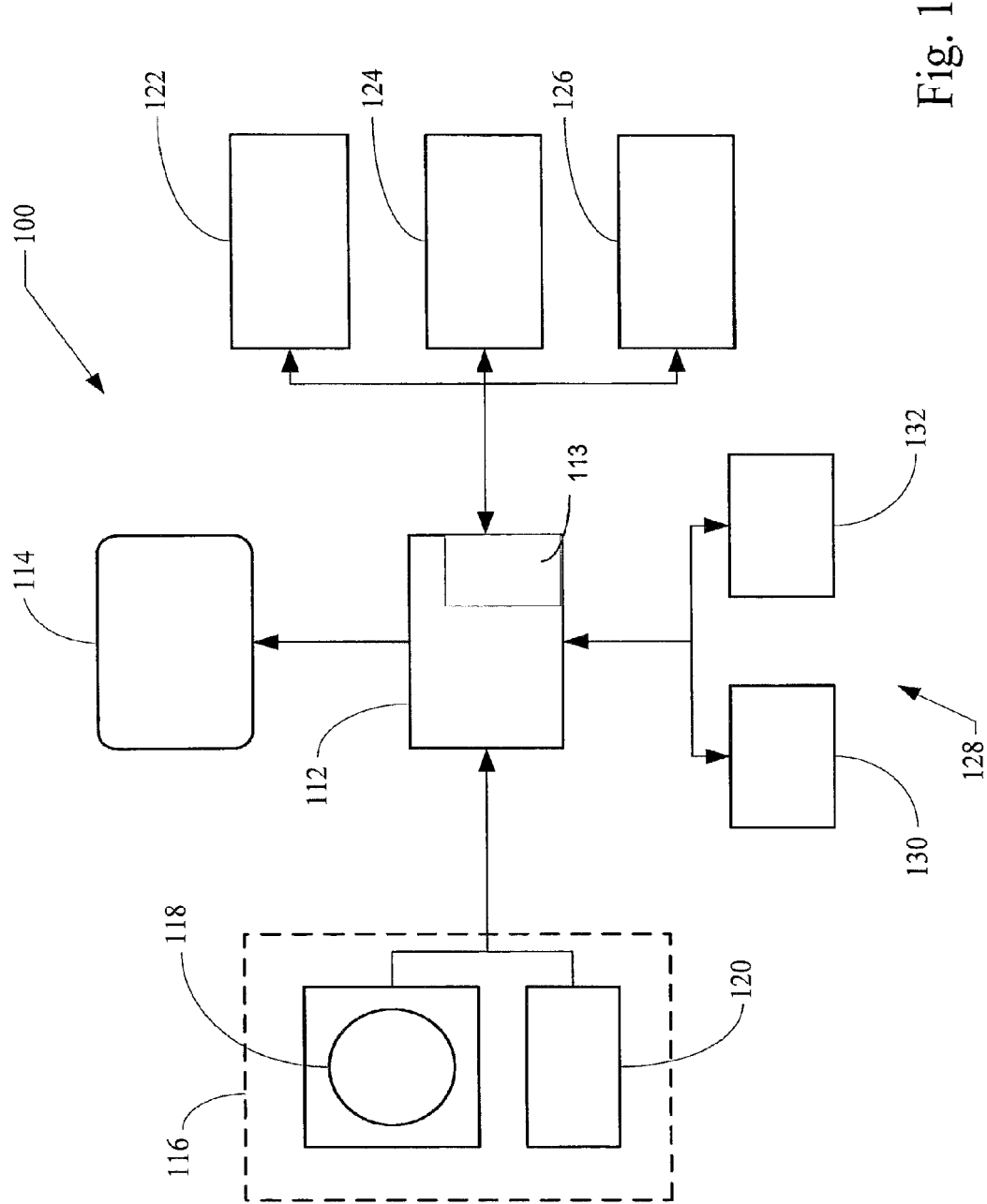
FIG. 1 is a block diagram of a vehicle multimedia system.

FIG. 1 is a block diagram illustrating a vehicle multimedia system 100. The vehicle multimedia system 100 allows users to reach a last accessed menu or menu item with a simple operation of a predetermined operating element 116. For instance, the vehicle multimedia system 100 includes a memory 130 that stores information identifying the last accessed menu or menu item. A memory control unit 113 may organize writing and reading of such information from and into the memory 130. The memory control unit 113 writes the information into the memory 130 when users activate a menu item to navigate a next menu. The operating element 116 may include a user programmable key, a switch, a button, etc. The memory control unit 113 reads the stored information from the memory 130 in response to the operation of the operating element 116. This information may be supplied to a central control unit 112 of the vehicle multimedia system 100. The central control unit 112 may reach the corresponding menu or menu item. The menu or menu item identified by the information is displayed or the function assigned to the menu item is performed.

The central control unit 112 controls the operation of the vehicle multimedia system 100. The central control unit 112 is connected with a display 114. The display 114 may be a dot matrix display, a liquid crystal display, a touch-panel display, or other display. The central control unit 112 transmits information to the display 114, which in turn presents the information to users.

The operating element 116 may include at least one switch. For example, the switch includes a rotary switch 118 and at least one push switch 120. Alternatively, or additionally, the operating element 116 may include other operating elements, such as push switches, rotary switches, rotary-push-button switches, etc. The operating element 116 also may include user programmable keys and/or user defined keys.

The vehicle multimedia system 100 further provides a hifi unit 122, a navigation unit 124, and a mobile telecommunications unit 126. The hifi unit 122 provides entertainment functions, such as a radio, CD/DVD players, a TV, etc. The hifi unit 122 includes electronic components that provide various entertainment functions. The navigation unit 124 may offer route guidance and include a global positioning system (GPS) component and a storage component for storing route information. For example, the storage component may be a DVD. The mobile telecommunications unit 126 offers telecommunication-related services, such as a telephone, internet, a short message service (SMS), e-mail, etc. The mobile telecommunications unit 126 includes a module for a global system for mobile communications (GSM) and/or an UMTS module for building a connection to a telecommunications provider.

The central control unit 112 controls functions and services offered by the hifi unit 122, the navigation unit 124, and the mobile telecommunications unit 126. Users may select desired functions and services via a hierarchically structured menu system. The vehicle multi-media system 100 may employ a menu system for selecting and activating a desired function or service. The menu system includes a plurality of menu items that may be selected and activated by users. The menu items are organized and structured hierarchically and assigned to a specific menu. For example, a menu has menu items that belong to a next higher menu item. The menu system will be described in detail below in conjunction with FIGS. 3 and 4.

The vehicle multimedia system 100 further includes a memory 128. The memory 128 includes a first memory element 130 and a second memory element 132. The first memory element 130 stores information identifying a menu, which will be described in conjunction with FIG. 5. The second memory element 132 stores general information that is necessary for operation of the vehicle multimedia system 100, such as a program code, configuration information, etc. The memory 128 may be controlled by a memory control unit 113. The memory control unit 113 may be integrated with the central control unit 112 or may function as a separate unit.

Figure 2:
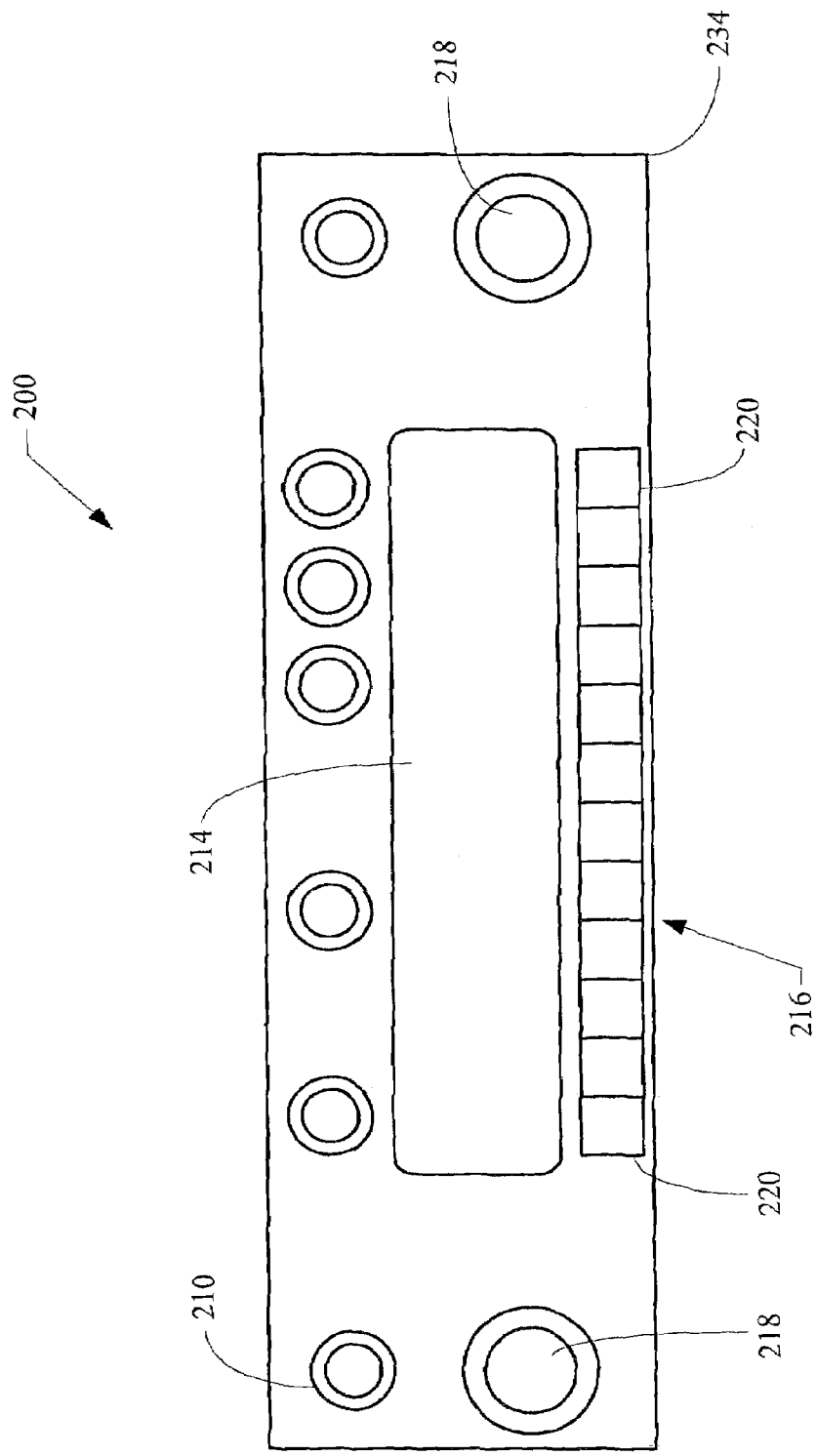
FIG. 2 is a schematic front view illustrating a vehicle multimedia system.

FIG. 2 illustrates a front view of a vehicle multimedia system 200. The system 200 includes a front panel 234 supporting a display 214 and an operating element 216. As shown in FIG. 2, the operating element 216 may include two rotary-push-button switches 218, ten push keys 220, and seven push keys 210. Those skilled in the art, however, will recognize that the vehicle multimedia system 200 may have fewer or more buttons, switches, and/or keys depending on differing configuration and/or operability. The configuration and/or operability may depend on the intended design and operation of the vehicle multimedia system 100. The push keys 220 may operate as user-programmable keys or soft keys. Soft keys may be programmable and/or defined by users such that they are assigned to variable functions depending on a menu displayed on the display 214. The push keys 210 may operate as hard keys. Hard keys may be assigned to a predetermined function. Hard keys may be factory-programmed to be assigned with a specific function. Alternatively, users may define or program a specific function to hard keys. Soft keys may be programmed to have variable and multiple functions, whereas hard keys may be assigned with a fixed function.

Although not shown, an enclosure may be provided to receive electronic components of the vehicle multimedia system 200, such as a control unit, a memory, and other devices. For example, the enclosure may include the central control unit 112, the memory 128, the hifi unit 122, the navigation unit 124, and the mobile telecommunications unit 126 of FIG. 1. Alternatively, the devices such as the hifi unit 122, the navigation unit 124, and the mobile telecommunications unit 126 may be separately installed from the enclosure when space is restricted.

In FIG. 2, users may operate the vehicle multimedia system 200 with the operating element 216, in particular, with switches 218 and the soft and hard keys 210 and 220. The switches 218 may be rotary and/or push button, or they may be activated by a touch panel, or other known type of switch. The vehicle multimedia system 200 offers a plurality of functions, services, and settings, which may be more than a number of switches. A menu system may be needed to make selection and activation of services, functions, and settings, as will be described in detail below.

Figure 3:
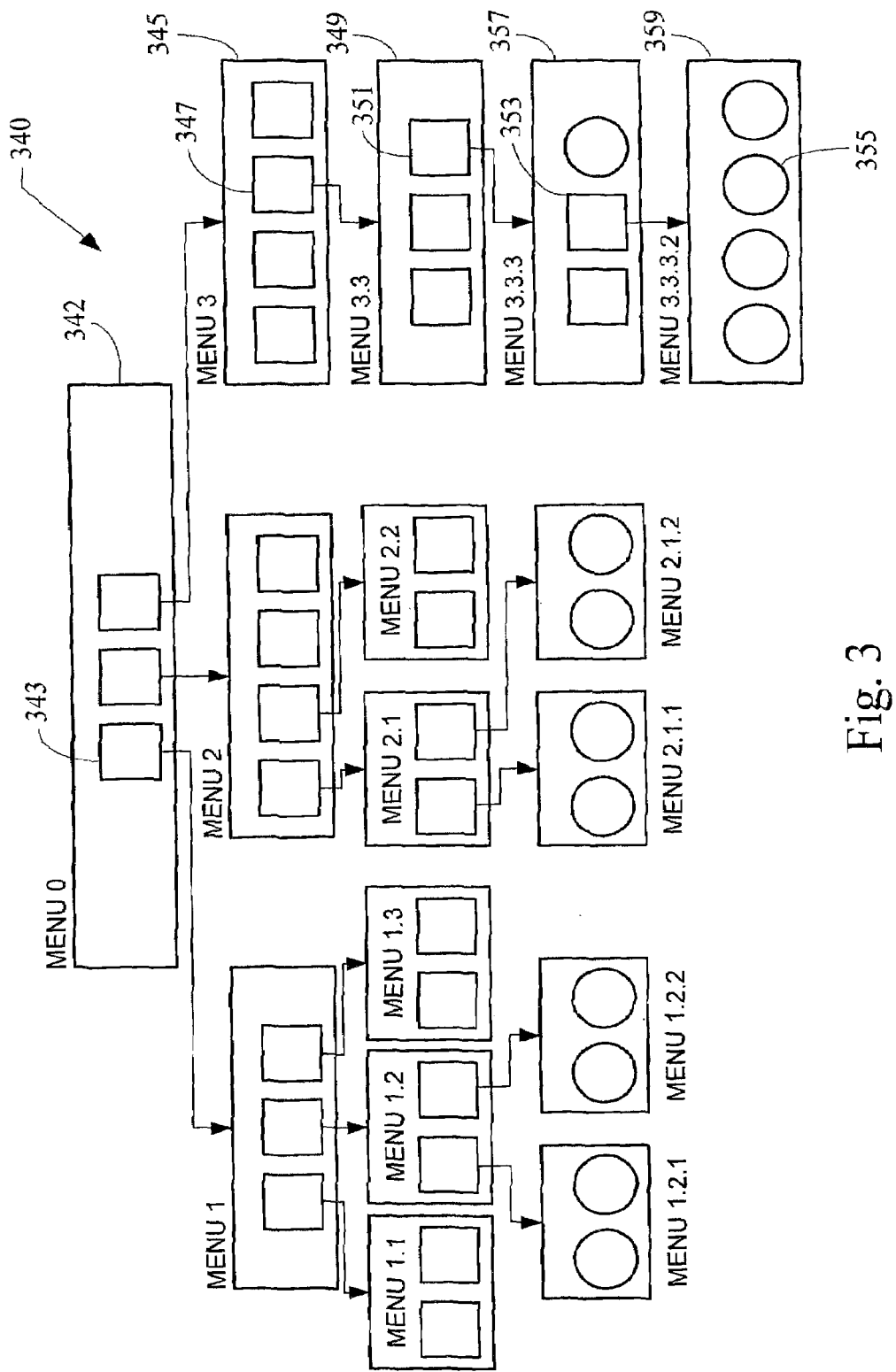
FIG. 3 is a block diagram of a hierarchically structured menu system.

FIG. 3 is a block diagram of a menu system 340 for use with the vehicle multimedia system 100 and 200. The menu system 340 is by way of example and various other menu systems are possible. The menu system 340 is hierarchically structured and includes a plurality of menu levels. In FIG. 3, for example, five menu levels are shown. Main menu 342, located on the main menu level shows, for example, Menu 0. The main menu 342 (Menu 0) has three menu items 343 that may be selected and activated by users. Users may operate an operating element such as one of switches 118 and 218 (FIGS. 1 and 2) to select and activate the menu items 343. In particular, a menu item of the main menu 342 may be displayed by a display such as the display 114 (FIG. 1) and users may select the displayed menu item by rotating the switches 118 and 218. Alternatively, or additionally, users may activate the menu item by pushing the switches 118 and 218. The term, "menu" may include a group of menu items that are simultaneously presented to users for selection.

In FIG. 3, each menu item 343 branches down to menus in the next menu level, as indicated with arrows. A second menu level provides, for example, three menus, including Menu 1, Menu 2, and Menu 3. Each of the Menus 1, 2, and 3 has menu items that may be selected and activated by users. Users also may reach a third menu level, which includes a plurality of different menus having menu items, respectively, as shown in FIG. 3.

In FIG. 3, the menu items are illustrated with squares and circles. The square menu items may indicate menu items for opening a submenu, and the circular menu items may indicate menu items for performing a function. Alternatively, the square menu items may include both submenus and menu items that perform a function.

Figure 4:
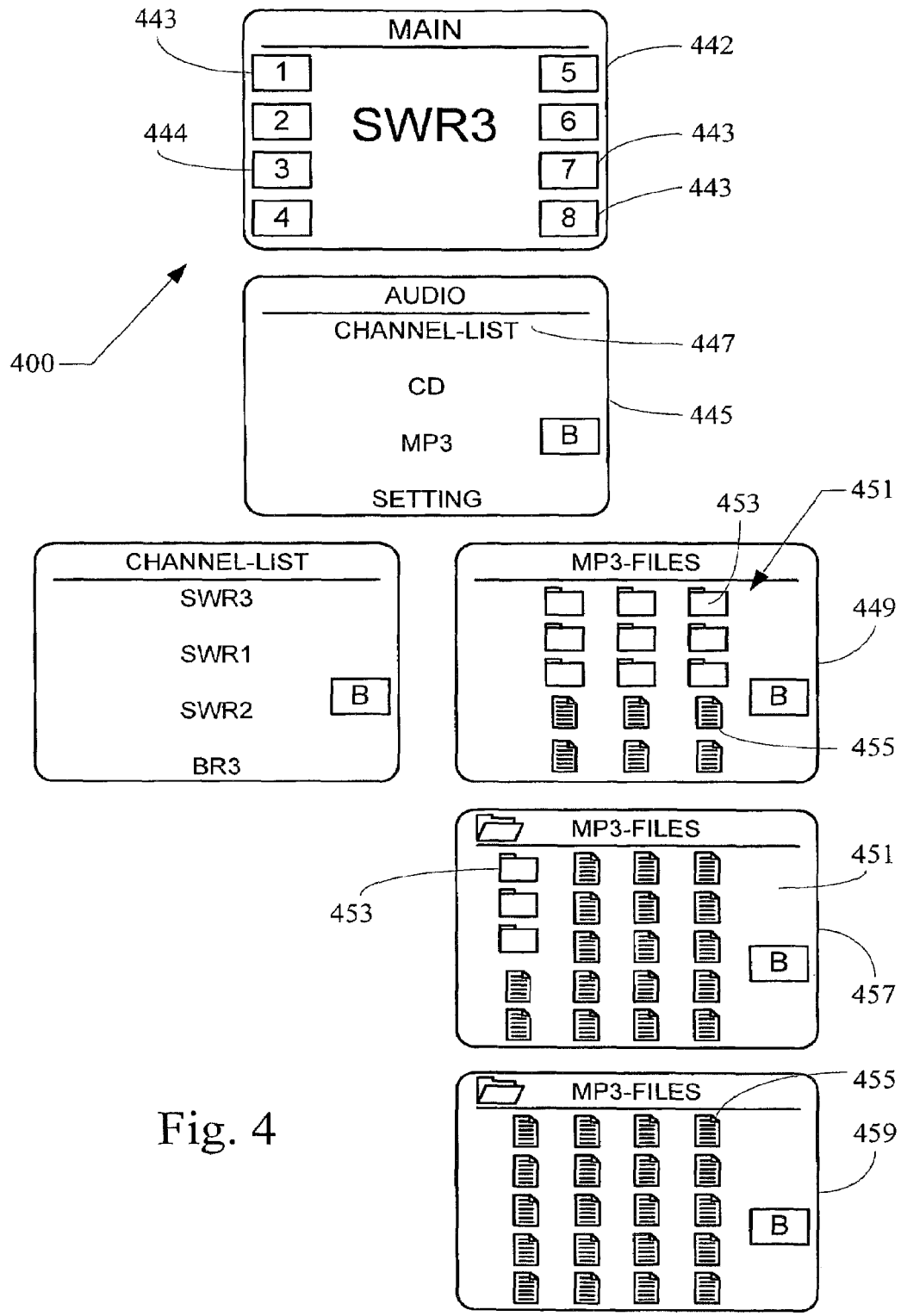
FIG. 4 illustrates one example of a hierarchically structured menu involving audio functions.

FIG. 4 illustrates a menu system 400 that includes menu and menu items involving audio functions. In FIG. 4, a display such as the display 114 of FIG. 1 displays the menu system 400. The main menu 442 may operate as a status screen showing necessary information, such as a selected radio station, field strength of a mobile module, etc. Further, the main menu 442 includes menu items 443 including eight items 1 to 8. Each menu item 443 operates to activate a specific service or function of a vehicle multimedia system such as the vehicle multimedia system 100 and 200. For example, a menu item 444 (item 3) may activate audio functions. When users select and activate the menu item 444, they reach a next menu 445. The term, "reach" may indicate jumping to a specific menu or menu item and displaying it on the display or directly activating a function assigned to the menu item. This menu 445 includes menu items 447 that may be selected by users. For example, the menu item "MP3" may allow users to activate the MP3 function of an audio unit. Subsequently, users may select files to be played (see, e.g., 449, 457, and 459).

When users select and activate the menu item "MP3," they reach the menu 449 in the next menu level. Menu 449 may include a plurality of menu items 451 represented by icons, such as icons 453 for file directories and/or icons 455 for files. When users select and activate the directory icon 453, they may reach a next menu level 457. Menu 457 may present other menu items 451 represented in form of directory and file icons for selection and activation, as shown in FIG. 4. Activation of a directory menu item allows a next menu level to be reached. In this menu 459, file menu items may be presented for selection. When a menu is presented, such as 459, that does not include a directory menu item, then menu 459 is a hierarchical end of this menu branch. A displayed menu item 455 performs a function, e.g., playback of a selected MP3 file.

Users may choose not to operate the operating elements 116 and 216 (FIGS. 1 and 2) for a predetermined time period. For instance, users may encounter heavy traffic or dangerous road conditions that require their attention during driving. In that case, a control unit such as the control unit 112 of FIG. 1 may return the menu system 400 to the main menu 442. For example, in FIG. 4, when users navigate down to the menu 459 and do not select and activate any menu items 455 for a predetermined time period, the main menu 442 may be displayed again.

To avoid the repetitive navigation back to the menu 459 via the previously navigated menus, for example, 447, 449, and 457, a vehicle multimedia system such as the vehicle multimedia systems 100 and 200 may use a memory 128. In the example disclosed, the memory 128 includes two memory elements 130 and 132. The second memory element 132 was discussed in FIG. 1. The first memory element 130 of the vehicle multimedia system 100 now will be explained. The first memory element 130 stores information identifying menus. The information may include a last activated menu or menu item. Alternatively, or additionally, the information may include a specific menu navigation saved by users. This information may be retrieved by activating a predetermined operating element, for example, the keys 210 and 220 of FIG. 2. In response to the activation of the operating element, the control unit 112 receives this information and causes the display 114 to display the menu corresponding to the retrieved information. In this manner, users may directly reach, for example, the last accessed menu or the saved menu.

Figure 5:
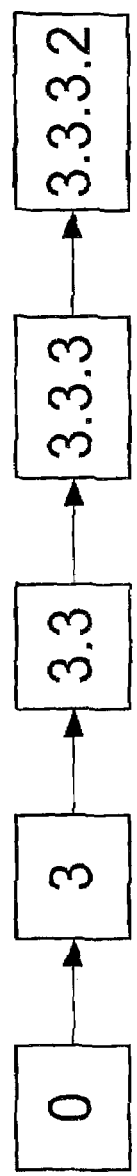
FIG. 5 illustrates content of a memory during navigation with the menu system of FIG. 3.

FIG. 5 illustrates content of the first memory element 130 of FIG. 1. The function of the first memory element 130 and its content are described with reference to FIGS. 3 and 5. By way of example, users have navigated from the main menu 342 to the menu 359 via the menu 345, 349, and 357. Further, users have activated a specific menu item 355 in the menu 359.

In FIG. 5, the first memory element 130 stores information identifying a menu, for example, so that users may return to that menu at a later time from anywhere in the menu system. The memory control unit 113 stores the value "0" identifying the main menu 342 in response to an activation of the menu item 343 of this menu 342. Then, upon activation of the menu item 347 of menu 345, the memory control unit 113 writes information "3" identifying the menu 345 (Menu 3). When users select the menu 349 (Menu item 3.3 in FIG. 3) and activate a key such as the key 220 of FIG. 2, the menu 345 may be displayed. The activation of the key at a later time causes a return to the last accessed menu. Alternatively, or additionally, the activation of the key may cause a return to the user saved menu. In response to the activation of the menu item 351 of the menu 349 (Menu 3.3), the information 3.3 identifying this menu 349 is stored in the first memory element 130. Then, the information 3.3.3 identifying the menu 357 (Menu 3.3.3) is stored in the first memory element 130 in response to the activation of the menu item 353 of this menu 357.

At this stage, the display 114 (FIG. 1) shows the menu 359. When users do not select and/or activate the menu system 340 for a certain period, the control unit 112 may return to the main menu 142 and drive the display 114 to display the main menu 342. If users operate the operating element 116, the memory control unit 113 reads the value stored in the first memory element 130, i.e., information "3.3.3" identifying the menu 357, and returns to the respective menu 357. Users now are able to proceed further with the selection of MP3 files, or other vehicle multimedia selections, without a repetitive navigation through the whole menu branch. Users may reach the menu 359 by activating the menu item 353. Once menu item 355 has been selected and activated, the information "3.3.3.2" identifying the menu 359 (Menu 3.3.3.2 in FIG. 3) is stored in the first memory element 130.

As a result, the memory control unit 113 operates to track the activated menu that includes the last activated menu item or the saved menu item. The memory control unit 113 ensures that the respective value of the last activated menu or the saved menu item is written into the first memory element 130. Further, the memory control unit 113 ensures that this value is read out of the first memory element 130 in response to the activation of the keys 210 and 220, so that the menu identified by the retrieved information from the first memory element 130 is displayed on the display 114.

Alternatively, or additionally, the memory control unit 113 may perform filtering with storage of menus and menu items. In particular, not every activated menu or menu item is stored in the first memory element 130. Rather, menus or menu items that correspond to a predetermined criterion, may be stored. For example, the memory control unit 113 may store only the menu or menu item that has been used for activation of a function. The memory control unit 113 may not store the menu or menu items that are used to jump to the next submenu. In FIG. 3, the menus 345, 349, and 357 may not be stored because the selected and activated menu items of these menus only lead to the next level menu (submenu). Accordingly, the menu 359 may be stored if the menu item 355 is selected and activated, but menu 359 may not be stored if the menu item 355 is not selected and activated. Alternatively, the memory control unit 113 may store the menu 359 if the system returns to the main menu 342 after lapse of a timeout period, although the menu item 355 has not been activated.

Figure 6:
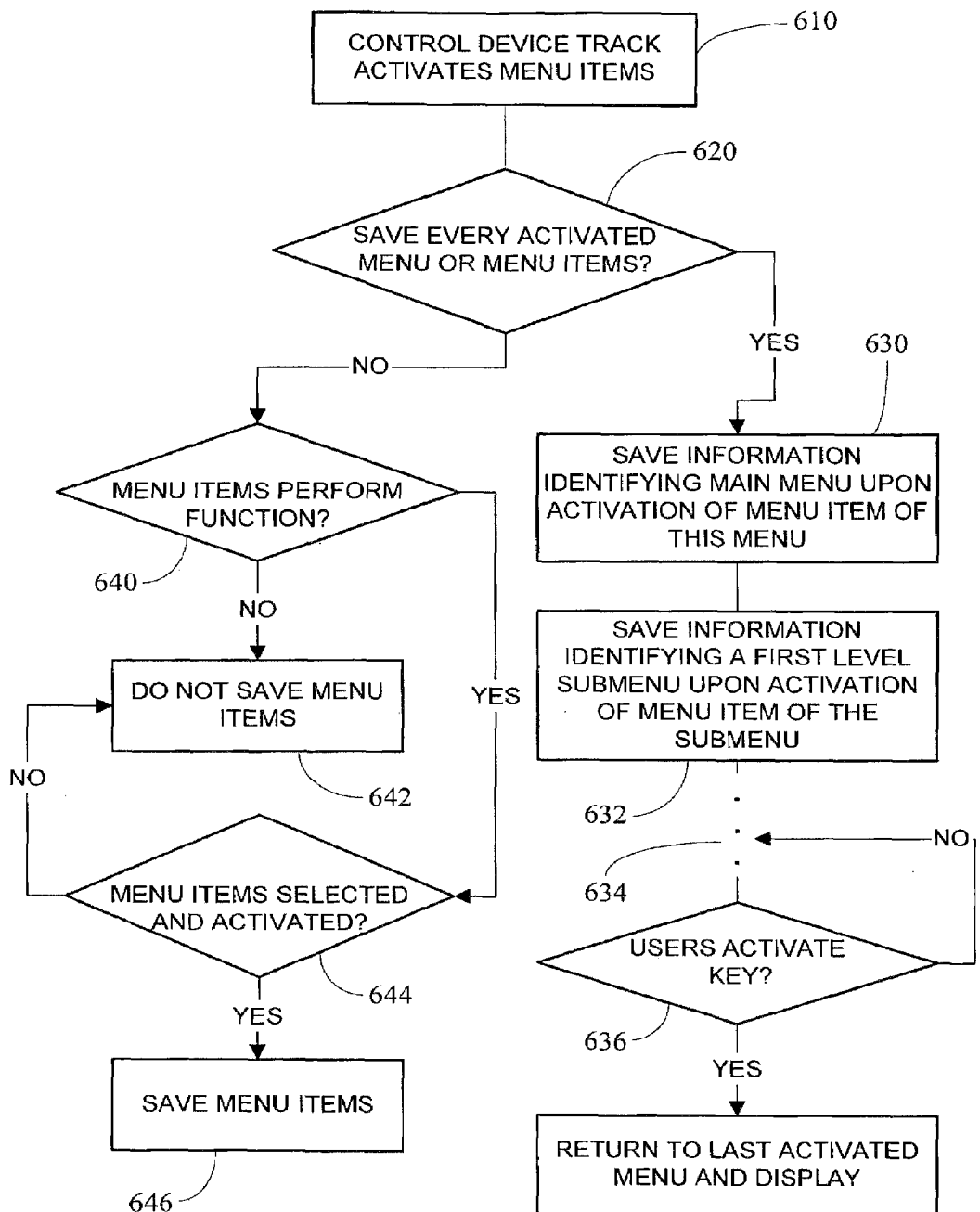
FIG. 6 is a flowchart illustrating a tracking process of a menu or menu items.

FIG. 6 is a flowchart illustrating a tracking process of menus or menu items by the control unit 112. The control unit 112 operates to track activated menus or menu items, as shown at 610. Users may want to recall navigation to a particular menu or menu item, and hence, may select to save every activated menu or menu item in the path to the desired menu or menu item. Alternatively, users may select to save some of activated menu or menu items, as shown at 620. When users select to save every activated menu or menu item, the control unit 112 operates to save information identifying a main menu upon activation of one of menu items that belong to the main menu, as shown at 630. Upon activation of the menu item, the menu automatically leads to a first level submenu. Upon activation of one of menu items in the first level submenu, the memory control unit 113 operates to save information identifying the first level submenu, as shown at 632. The activation of the menu item of the first level submenu automatically leads to a second level submenu and this process may be repeated until the menu may reaches a menu item of a hierarchically lowest menu, as shown at 634. Alternatively, or additionally, users may activate a key such as the keys 210 and 220 of FIG. 2. Upon activation of the key by users, the control unit 112 stops tracking and returns to the last activated menu, as shown at 638. A display such as the display 114 of FIG. 1 displays the last activated menu. When no selection or activation of the menu or menu items is made for a certain time period, the display 114 may display the main menu 342. Users may operate the key to retrieve the last accessed menu.

In FIG. 6, when users activate the key, the last activated menu may be retrieved and displayed, as shown at 638. Alternatively, users may desire to save certain menu navigations for various reasons, such as because they arrive at their destination, they are interrupted by traffic, phone, etc, or they may desire to repeat the menu navigation, etc. A key of an operating element such as the keys 210 and 220 may be used to save and/or retrieve menu navigation paths. Users may program or define the key to perform saving and/or retrieving functions.

When users select to save only some of activated menu or menu items, for example, due to limited storage, the control unit 112 may apply specific criteria to determine which menu or menu items to be saved. By way of example, the control unit 112 may determine whether menu items perform a certain function, as shown at 640. According to the criteria, menu items performing no functions, such as those that lead to a submenu, may not be saved, as shown at 642. When a menu item performs a certain function, the control unit 112 determines whether the menu item is selected and activated, as shown at 644. Then, the selected menu items may be saved. If the menu item is not selected and activated, the menu item may not be saved, as shown at 642.

Figure 7:
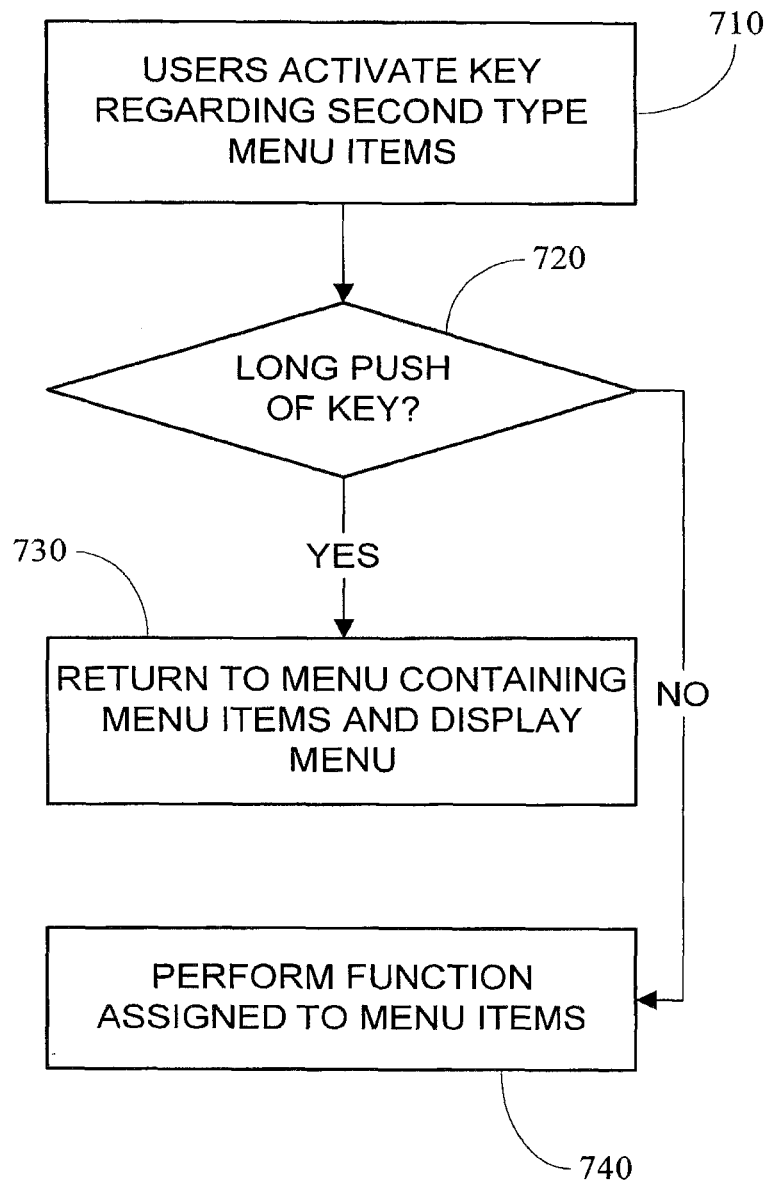
FIG. 7 is a flowchart illustrating activation of a key.

As described above in conjunction with FIG. 3, there are at least two different types of menu items. The first type of menu items may provide for jumping to a submenu (indicated as squares in FIG. 3), and the second type of menu item may perform a function (indicated as circle in FIG. 3). FIG. 7 is a flowchart illustrating activation of a key with respect to the second type of menu item. The key may offer to users first and second actions upon activation. Upon selection by users of the first action, the activation of the key may cause the system to return to a menu containing the menu item, as shown at 730. In FIG. 3, the activation of the key results in return to and display of menu 359 (Menu 3.3.3.2) containing the stored "menu item 355." Alternatively, the activation of the second action may result in performance of functions assigned to this specific menu item, as shown at 740. In FIG. 3, the activation of the key results in the playback of the respective MP3-file indicated by menu item 355. For example, users may select one of actions with a long push and the other action with a short push of the key, as shown at 720. When users push the key for a long time period, the first action is performed, as shown at 730. When the key is pushed for a short time period, the second action is performed, as shown at 740. Other known methods of distinguishing between activation of a first and second action may also be used such as turning the key to the left for one and to the right for the second, etc.

In FIG. 7, the key may be either a soft key or a hard key. The hard key may be factory programmed to perform a certain function such as retrieving the stored information from a memory and displaying the last accessed menu or menu item on a display. Users may program a soft key to perform a function or that same function may be programmed or preprogrammed in the hard key. Soft keys may be programmed to support and activate various functions provided by the menu system 340 and 400. Keys may be designed and installed so that they are ergonomically convenient and accessible to users. Users often may use keys while driving and ergonomic design and structure of keys may increase safety level of a vehicle.

The memory control unit 113 may store information about a menu or menu item in two different ways, i.e., saving it as a link and/or as a reference. When a link is stored, an activation of the link with the key causes the system to display each menu and the menu containing the menu item, respectively. When a reference is stored, activation of the reference with the key may cause the system to directly perform the function assigned to the menu item.

Figure 8:
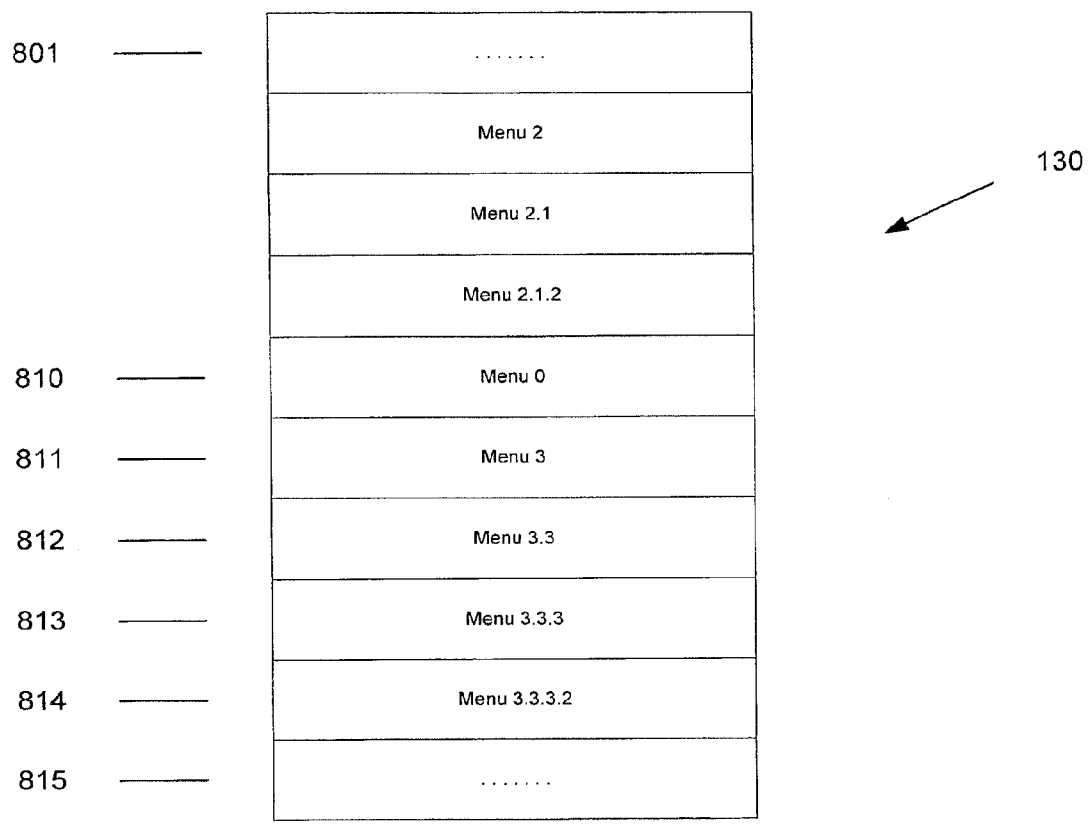
FIG. 8 is a schematic diagram of the memory element storing the last activated menus.

FIG. 8 illustrates the first memory element 130 with a plurality of memory cells. The memory control unit 113 may store the value "0" identifying the main menu 342 in response to an activation of a menu item of this menu 342. For storing this information, the memory control unit 112 may select a memory cell 801. The memory control unit 113 may increment a counter value "n," which may be increased by 1 after each storing process. If the counter value n reaches the maximum value "m," the counter value n is set to 0. The information stored in memory cell 801 may be overwritten by a new piece of information if the preceding memory cell was the "m'th" memory cell after memory cell 801 (815 in this example). The first memory element 130 may be organized as ring memory.

After storing the value "0" identifying the main menu 342 in memory cell 810, the counter value n may be increased by one and then, upon activation of a menu item 347 of menu 345, the memory control unit 113 may write the information "3" identifying the menu 345 (menu 3 in FIG. 3) in memory cell 811. In response to the activation of menu item 351 of menu 349 (menu 3.3), the information "3.3" identifying the menu 349 is stored in the next cell 812 of the first memory element 130. Then, the information 3.3.3 identifying the menu 357 (menu 3.3.3 in FIG. 3) is stored in the next memory cell 813 in response to the activation of menu item 353 of this menu. If the user then selects and activates a menu item 355 in the menu 359, the information "3.3.3.2" identifying the menu 359 (menu 3.3.3.2 in FIG. 3) is stored in the memory element 130, namely in memory cell 814.

Figure 9:
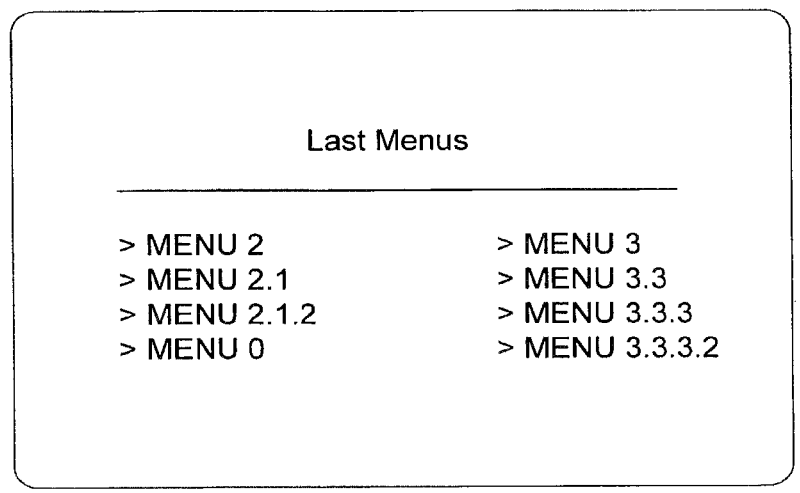
FIG. 9 is a schematic diagram of a menu including the last activated menus as menu items.

If the user does not operate the operating element 116 within a predetermined time period (timeout period), the control unit 112 returns back to the main menu 342. If the user now operates the hard key 210, the memory control unit 113 reads all the values stored in the memory element 130 and displays these values within a specific menu 900, which is shown in FIG. 9 and which is referenced as "last menus." All values of memory cells 801 to 815 are displayed as selectable and activatable menu items. This menu allows the user to select one of these menu items, for example the menu item "menu 3.3" and to activate the menu item by operating the switch 218. In response to this activation, the respective menu 349 is displayed on the display 114.

Figure 10:
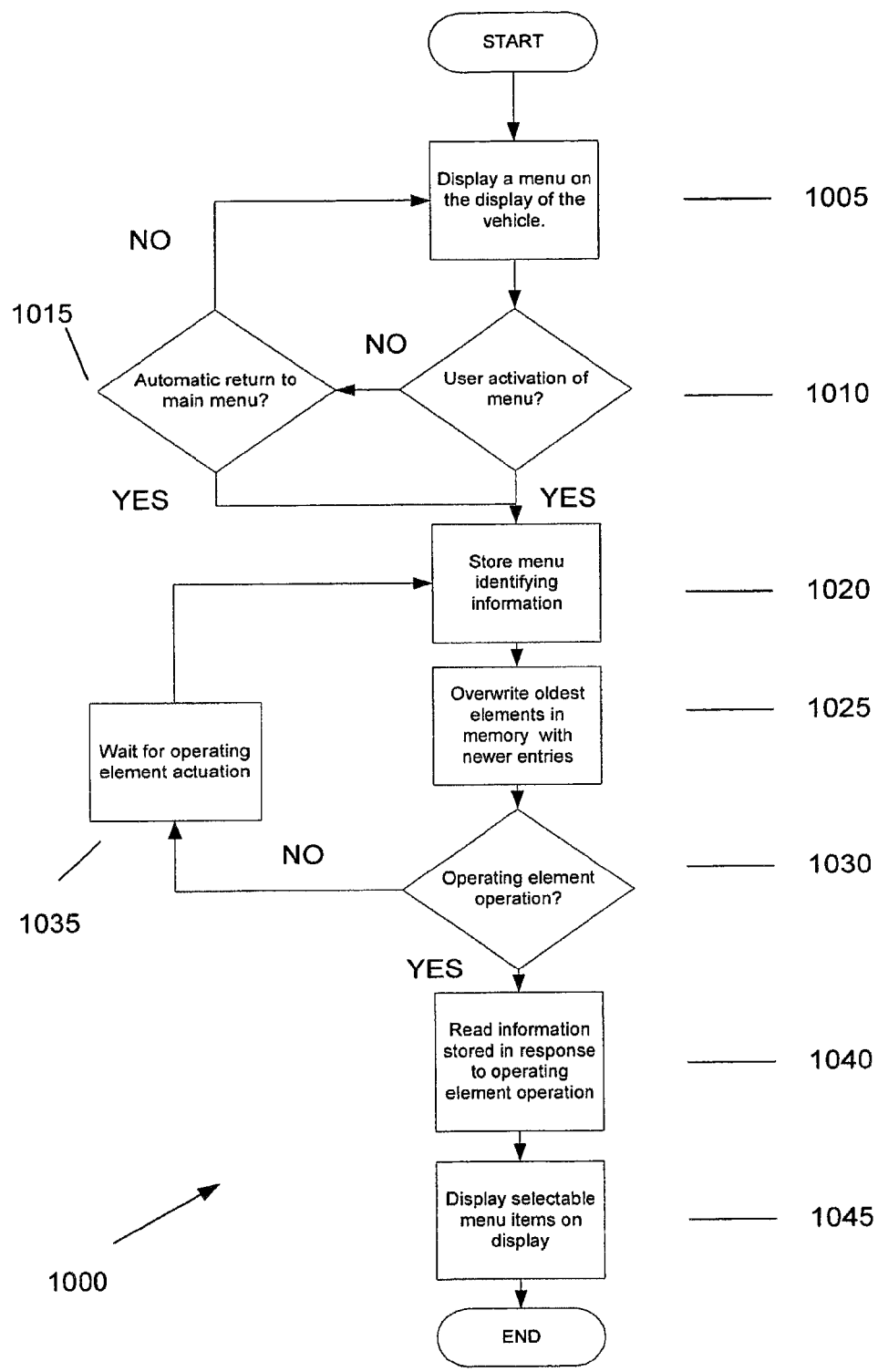
FIG. 10 is a flowchart illustrating display of menu items in response to operation of an operating element.

FIG. 10 illustrates a method 1000 for displaying menus or menu items in response to operation of an operating element 116. The control unit 112 may display a menu on the display 114, as shown in 1005. At block 1010, the control unit 112 may determine if the user has activated a menu. If the user has not activated a menu, the control unit 112 may determine if there has been an automatically-caused return to a predetermined menu, such as the main menu, as shown in 1015. If there has not been an automatically-caused return to a predetermined menu, the control unit 112 may display a menu as in block 1005. If there has been an automatic return to a predetermined menu, or if the user has activated a menu, the memory control unit 113 may store information identifying the displayed menu or menu item, as shown in 1020. The memory control unit 113 may replace older entries stored in the memory element 130 with newer entries, as implemented in a ring memory as shown in 1025.

The control unit 112 then may determine if the user has actuated the operating element 116 at block 1030. If the user has not actuated the operating element 116, the control unit 112 may wait for the user to interact with the operating element 116, as shown in 1035. If the user actuates the operating element 116, for example to select a menu or menu item, the memory control unit 113 may read predetermined information stored in the memory element 130, as shown in 1040. Examples of the information include, for example, menu level listings. At block 1045, the control unit 112 may display the read pieces of information as selectable and activatable menu items on the display 114. The user's selection and activation of the menu item allows the display of the menu or menu item identified by the information.

The vehicle multimedia system 100 and 200 may control the display of the hierarchically structured menus 340 and 400 on the display 114 with improved ergonomics. The mechanism of reaching the last accessed menu or menu item has a particular advantage when the control unit 112 is operated to return to a predetermined menu upon no selection or activation of users for a predetermined time period, i.e., timeout period. The predetermined menu may be the main menu 342 and/or 442. The displayed information on the display 114 returns back or returns to the main menu 342 and/or 442, which may be referred to as a status screen. The status screen with the most important status information may be displayed without any delay after the selection and activation of any menu item without inconvenience to users. For example, users may choose not to operate the operating elements 116 and/or 216 to return to the main menu 342 and/or 442. Hence, the display 114 may not remain on the selected and activated menu, but rather, may return to the informative menu (status screen) that may be more valuable for users. The memory 130 may store the information identifying the selected and activated menu or menu items. The stored information may be retrieved from the memory 130 upon activation of the operating elements including switches and/or keys. Subsequently, users may quickly reach a specific menu or menu item corresponding to the retrieved information, such as the last accessed menu or the saved menu.

Like the method shown in FIGS. 6, 7, and 10, the sequence diagrams may be encoded in a signal bearing medium, a computer readable medium such as a memory, programmed within a device such as one or more integrated circuits, or processed by an operating element or a computer. If the methods are performed by software, the software may reside in a memory resident to or interfaced to the control unit 112 or memory control unit 113, a communication interface, or any other type of non-volatile or volatile memory interfaced or resident to the control unit 112 or memory control unit 113. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium" "and machine-readable medium" may comprise any non-transitory means that contains, stores, communicates, propagates, or transports software for use by or in connection with an instruction executable system, apparatus, or device. The non-transitory machine-readable medium may selectively be, but not limited to, an electronic, magnetic, optical, electromagnetic, infrared, or semiconductor system, apparatus, device, or propagation medium. A non-exhaustive list of examples of a non-transitory machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A non-transitory machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The vehicle multimedia system may be adapted for use in different mobile vehicle platforms. Vehicles may include any device or structure for transporting persons or things. These multimedia systems may be used in portable systems or on vehicles such as automobiles, trucks, farming equipment, mining equipment, golf carts, motorized off-road vehicles, motorcycles, mopeds, and mobile robots. These multimedia systems may also be used in sea-borne or air-borne vehicles such as ships, airplanes, helicopters, spacecraft, balloons, and gliders.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for controlling the display of hierarchically structured menus where each menu includes at least one menu item for being selected and activated comprising:
displaying a menu on a display of a vehicle multimedia system;
determining, with a control unit, whether a predetermined criterion corresponding to a displayed menu or menu item is satisfied;
the control unit storing information identifying the displayed menu or menu item in response to an activation of a menu item or in response to an automatically caused return to a predetermined menu;
reading, with the control unit, information stored in response to an operation of an operating element; and
the control unit displaying the read information as selectable and activatable menu items on the display, where the selection and activation of the menu item allows the display of the menu or menu item identified by the information;

wherein the information identifying the displayed menu or menu item is selectively stored based on the predetermined criterion such that the information is stored if the criterion is satisfied and the information is not stored if the criterion is not satisfied.

2. The method of claim 1 where the return to a predetermined menu occurs after a predetermined period of time.

3. The method of claim 1 where the predetermined menu is a main menu or main status screen.

4. The method of claim 1 where the memory element is selected from the group consisting of: a flash memory, a non-volatile memory, and a hard-disk memory.

5. The method of claim 1 wherein the predetermined criterion is a menu type or menu item type and wherein:
the information identifying the displayed menu or menu item is stored in response to a determination, based on the menu type or menu item type, that the displayed menu or menu item activates a function; and
the information identifying the displayed menu or menu item type is not stored in response to a determination, based on the menu type or menu item type, that the displayed menu or menu item displays a submenu.

6. The method of claim 1 wherein a first action is performed in response to a long operation of the operating element and a second action is performed in response to a short operation of the operating element.

7. The method of claim 6 wherein the first action returns to a selected menu in the hierarchically structured menus and the second action returns to and activates a selected menu item.

8. The method of claim 1 where the information is adjustable.

9. The method of claim 8 further comprising:
the control unit storing the information in a memory organized as a ring memory; and
overwriting one or more old memory entries by one or more new entries if the memory is full.

10. The method of claim 9 where the stored information is capable of deletion by the user.

11. A computer program product comprising:
a non-transitory computer useable medium having a computer readable code means embodied in the medium for controlling the display of hierarchically structured menus on a display of a vehicle multimedia system, the computer readable program code in the computer program product comprising:
computer readable program code means for causing a control unit to display a menu on the display;
computer readable program code means for determining whether a predetermined criterion corresponding to a displayed menu or menu item is satisfied;
computer readable program code means for causing a memory control unit to store information identifying the displayed menu or menu item in response to an activation of a menu item or in response to an automatically caused return to a predetermined menu;
computer readable program code means for causing the memory control unit to read information stored in response to an operation of an operating element;
computer readable program code means for causing the control unit to display the read information as selectable and activatable menu items on the display, where the selection and activation of the menu item allows the display of the menu or menu item identified by the information; and
computer readable program code means for causing the control unit to selectively store the information identifying the displayed menu or menu item based on a predetermined criterion such that the memory control unit stores the information if the criterion is satisfied and the memory control unit does not store the information if the criterion is not satisfied.

12. The computer program product of claim 11 further comprising:
computer readable program code means for causing the memory control unit to store the information in a memory; and
computer readable program code means for causing the memory control unit to overwrite one or more old memory entries by one or more new entries if the memory is full.

13. The method of claim 12 where the memory is organized as a ring memory.

14. The computer program product of claim 11 wherein the predetermined criterion is a menu type or menu item type and the computer program product further comprising:
computer readable program code means for causing the memory control unit to store the information identifying the displayed menu or menu item in response to a determination, based on the menu type or menu item type, that the displayed menu or menu item activates a function; and
computer readable program code means for causing the memory control unit not to store the information identifying the displayed menu or menu item in response to a determination, based on the menu type or menu item type, that the displayed menu or menu item displays a submenu.

15. The computer program product of claim 11 further comprising:
computer readable program code means for performing a first action in response to a long operation of the operating element; and
computer readable program code means for performing a second action in response to a short operation of the operating element.

16. The computer program product of claim 15 wherein the first action returns to a selected menu in the hierarchically structured menus and the second action returns to and activates a selected menu item.

17. A method of controlling the display of hierarchically structured menus comprising:
driving a display of a vehicle multimedia system with a control unit to display a menu comprising menu items;
determining, with the control unit, whether a predetermined criterion corresponding to a displayed menu or menu item is satisfied;
the control unit selectively storing information identifying the displayed menu or menu item in response to the predetermined criterion being satisfied, and at least one of activation of a menu item or an automatically caused return to a predetermined menu, the information being selected for storage in response to the predetermined criterion being satisfied and the information not being selected for storage in response to the predetermined criterion not being satisfied;
reading, with the control unit, the selectively stored information in response to an operation of an operating element; and the control unit driving the display to display the read information as the menu or menu item identified by the information.

18. The method of claim 17, where the displayed menu or menu item is the last accessed menu or menu item.

19. The method of claim 17, where the control unit driving the display further comprises the initial step of the control unit driving the display to display at least one of selectable or activatable menu or menu items, where the selection or activation of the at least one of selectable or activatable menu or menu items allows the display of the menu or menu items identified by the information.

20. The method of claim 17, further comprising the control unit overwriting previously stored information with the information, the previously stored information selected by the control unit for overwriting based on being stored the longest.

* * * * *